(12) United States Patent
Jih-Kuei

(10) Patent No.: US 8,104,561 B2
(45) Date of Patent: Jan. 31, 2012

(54) REAR WHEELS MOUNTING STRUCTURE OF MOTORIZED TRICYCLE

(75) Inventor: Cho Jih-Kuei, Guanyin Township, Taoyuan County (TW)

(73) Assignee: Shine Far Metal Industry Co., Ltd., Taoyuan County (TW)

( * ) Notice: Subject to any disclaimer, the term of this patent is extended or adjusted under 35 U.S.C. 154(b) by 313 days.

(21) Appl. No.: 12/567,839

(22) Filed: Sep. 28, 2009

(65) Prior Publication Data

US 2011/0074131 A1    Mar. 31, 2011

(51) Int. Cl.
*B62K 13/04* (2006.01)
*B62K 5/02* (2006.01)
*B62K 11/02* (2006.01)

(52) U.S. Cl. ............... 180/209; 180/210; 280/282

(58) Field of Classification Search .............. 180/209, 180/210, 215; 280/282, 295
See application file for complete search history.

(56) References Cited

U.S. PATENT DOCUMENTS

| | | | | |
|---|---|---|---|---|
| 2,435,021 A | * | 1/1948 | Seider | 180/212 |
| 3,498,633 A | * | 3/1970 | Hopkins | 280/204 |
| 5,529,141 A | * | 6/1996 | Lehman et al. | 180/209 |
| 7,819,216 B1 | * | 10/2010 | Johnson | 180/209 |

* cited by examiner

*Primary Examiner* — Joanne Silbermann
*Assistant Examiner* — Daniel Yeagley

(57) ABSTRACT

A motorized tricycle comprising a frame including first, second, and third coupling members, two rear wheels, and a rear wheels mounting structure comprising side pieces on either side; cross pieces interconnecting the side pieces; two forward cylindrical first joints; two seats each projecting upward from the topmost side piece and comprising a top second joint and a bottom first threaded hole; two second threaded holes each disposed on a section between the first and second joints of the same side; two inverted L-shaped reinforcement plates comprising a hollow boss projecting inward from a bending point, and first and second through holes at both ends respectively; two sleeves each put on the first joint; two cylinders each disposed in the second joint; and screws for securing the reinforcement plate, the rear wheels mounting structure, and the frame together.

3 Claims, 5 Drawing Sheets

REAR WHEELS MOUNTING STRUCTURE OF MOTORIZED TRICYCLE

BACKGROUND OF THE INVENTION

1. Field of Invention

The invention relates to custom-made motorized tricycles and more particularly to a rear wheels mounting structure of motorized tricycle with improved characteristics.

2. Description of Related Art

Conventionally, motorized tricycles are custom-made ones. For example, a motorcycle can be modified as a motorized tricycle. However, a number of drawbacks have been found in the rear wheels mounting structure of the conventional motorized tricycle. For example, its structure is not strong, it is not durable (i.e., reduced period of lifespan), etc. Thus, the need for improvement still exists.

SUMMARY OF THE INVENTION

It is therefore one object of the invention to provide a motorized tricycle comprising a frame including first, second, and third cylindrical coupling members having a threaded bore, two rear wheels, and a rear wheels mounting structure comprising a plurality of side pieces on either side; a plurality of cross pieces interconnecting the side pieces; two spaced cylindrical first joints at two forward ends respectively; two seats each projecting upward from the topmost side piece and comprising a top second joint and a bottom first threaded hole; two second threaded holes each disposed on a section between the first joint and the second joint of the same side; two inverted L-shaped reinforcement plates comprising a hollow boss projecting inward from a bending point, a first through hole proximate one end, and a second through hole proximate the other end; two sleeves each put on the first joint; two cylinders each disposed in the second joint; and a plurality of threaded fasteners wherein at either side of the frame a first threaded fastener is driven through the boss into the first cylindrical coupling member, a second threaded fastener is driven through the first through hole into the second threaded hole, a third threaded fastener is driven through the second through hole into the first threaded hole, a fourth threaded fastener is driven through both the cylindrical joint and the sleeve into the third cylindrical coupling member, and a fifth threaded fastener is driven through both the cylinder and the top joint into the first cylindrical coupling member to secure the reinforcement plate, the rear wheels mounting structure, and the frame together.

In one aspect of the invention there are further provided two suspension assemblies each comprising a lower A-shaped arm interconnecting the rear wheel and the bottommost side piece of the same side, and an upper rod interconnecting the rear wheel and the intermediate side piece of the same side.

In another aspect of the invention there are further provided two shock absorbers each comprising a spring-biased rod member interconnecting the rear wheel and the topmost side piece of the same side.

The above and other objects, features and advantages of the invention will become apparent from the following detailed description taken with the accompanying drawings.

DETAILED DESCRIPTION OF THE INVENTION

Figure 1:
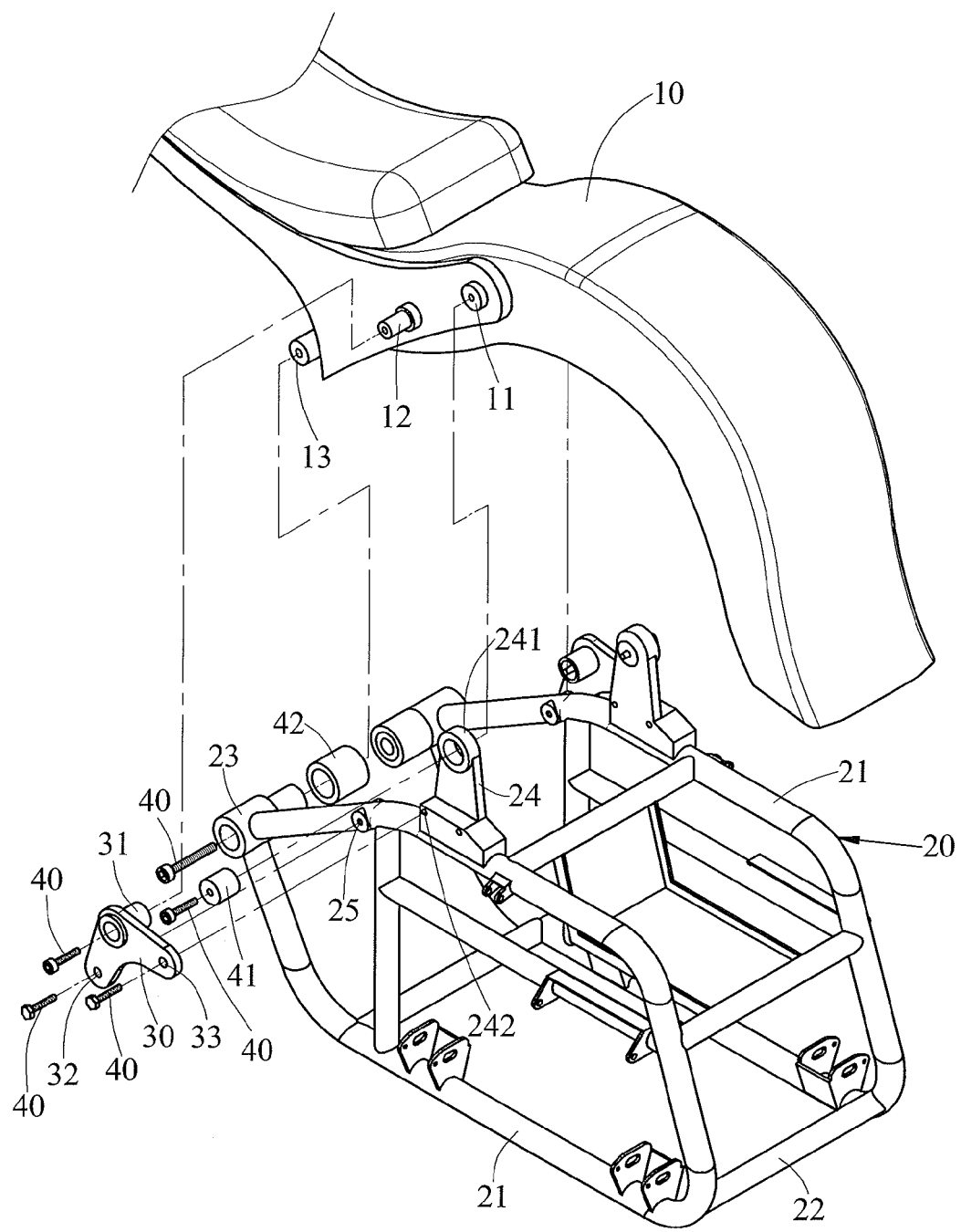
FIG. 1 is an exploded view of main components of a rear wheels mounting structure of motorized tricycle according to the invention.
Figure 2:
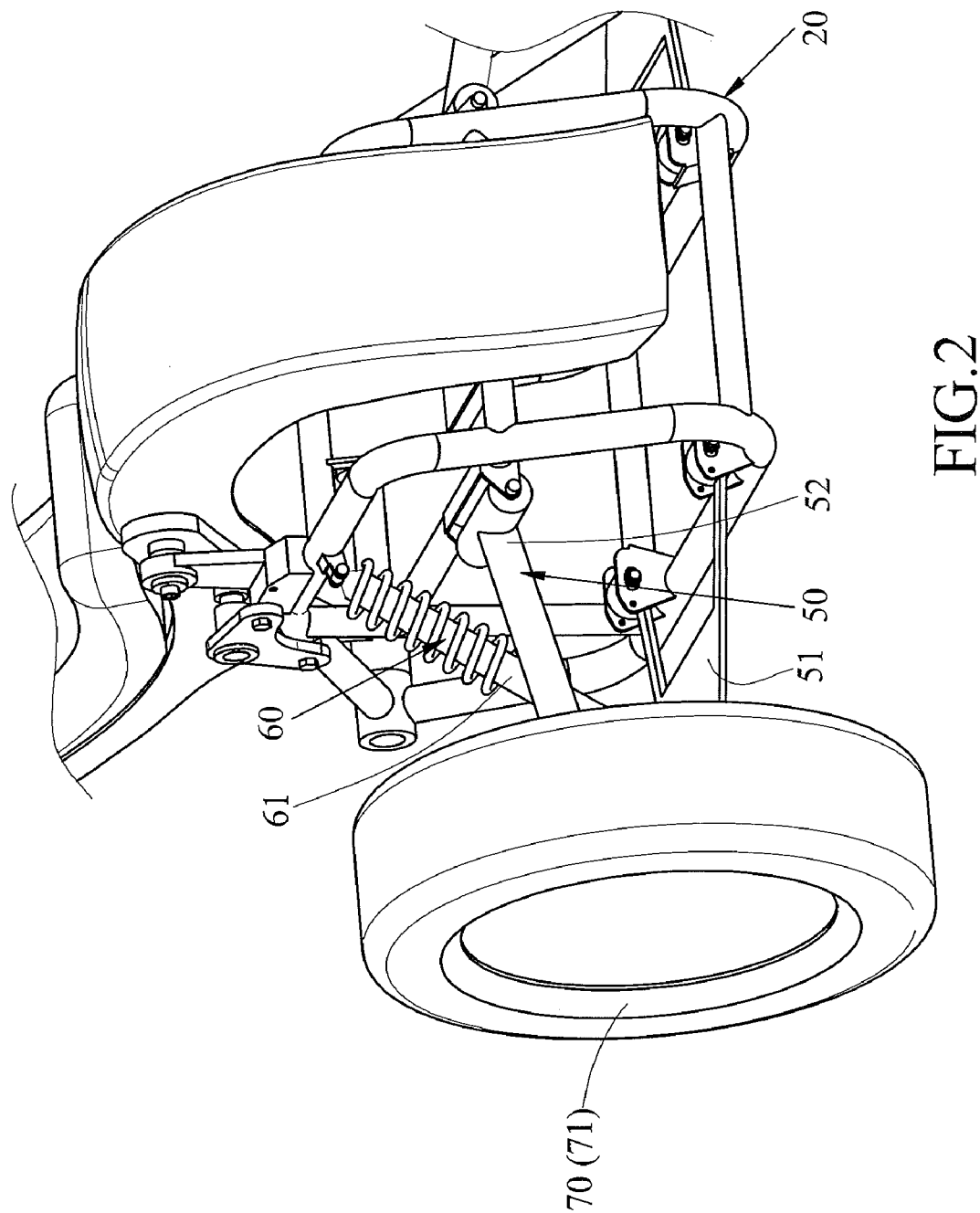
FIG. 2 is a perspective view of the assembled rear wheels mounting structure being installed in the motorized tricycle.
Figure 3:
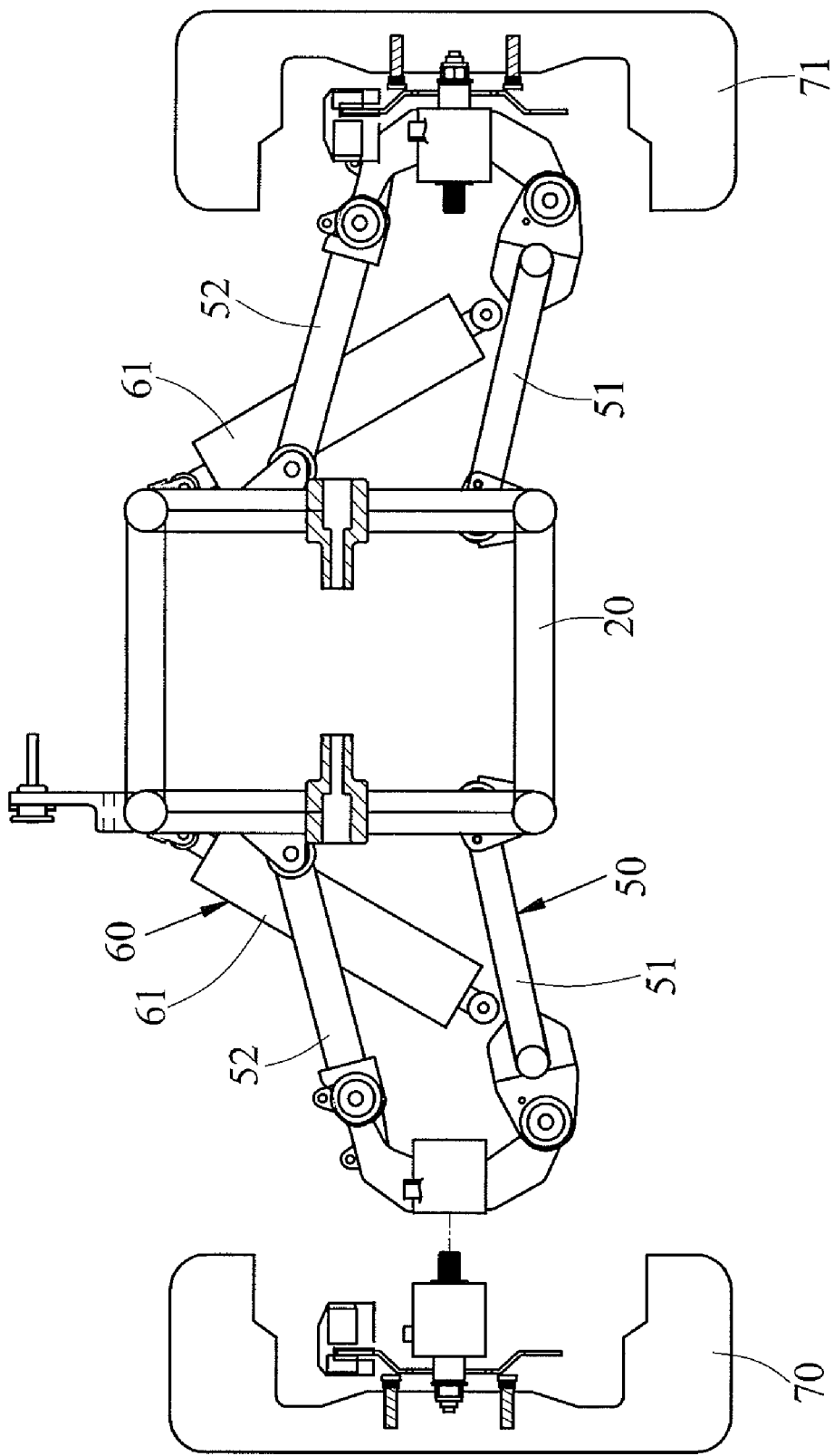
FIG. 3 is a schematic top plan view of FIG. 2.

Referring to FIGS. 1 to 5, a rear wheels mounting structure 20 of a motorized tricycle 10 in accordance with the invention is shown. The motorized tricycle 10 comprises first, second, and third cylindrical coupling members 11, 12, and 13 having a threaded bore provided under a seat (not numbered).

The rear wheels mounting structure 20 comprises three side pieces 21 on either side, four cross pieces 22 interconnecting the side pieces 21, two spaced cylindrical joints 23 at two forward ends, two seats 24 each projecting upward from the topmost side piece 21 and comprising a top joint 241 and a bottom first threaded hole 242, and two second threaded holes 25 each provided on a section between the joint 23 and the joint 24 of the same side.

Figure 4:
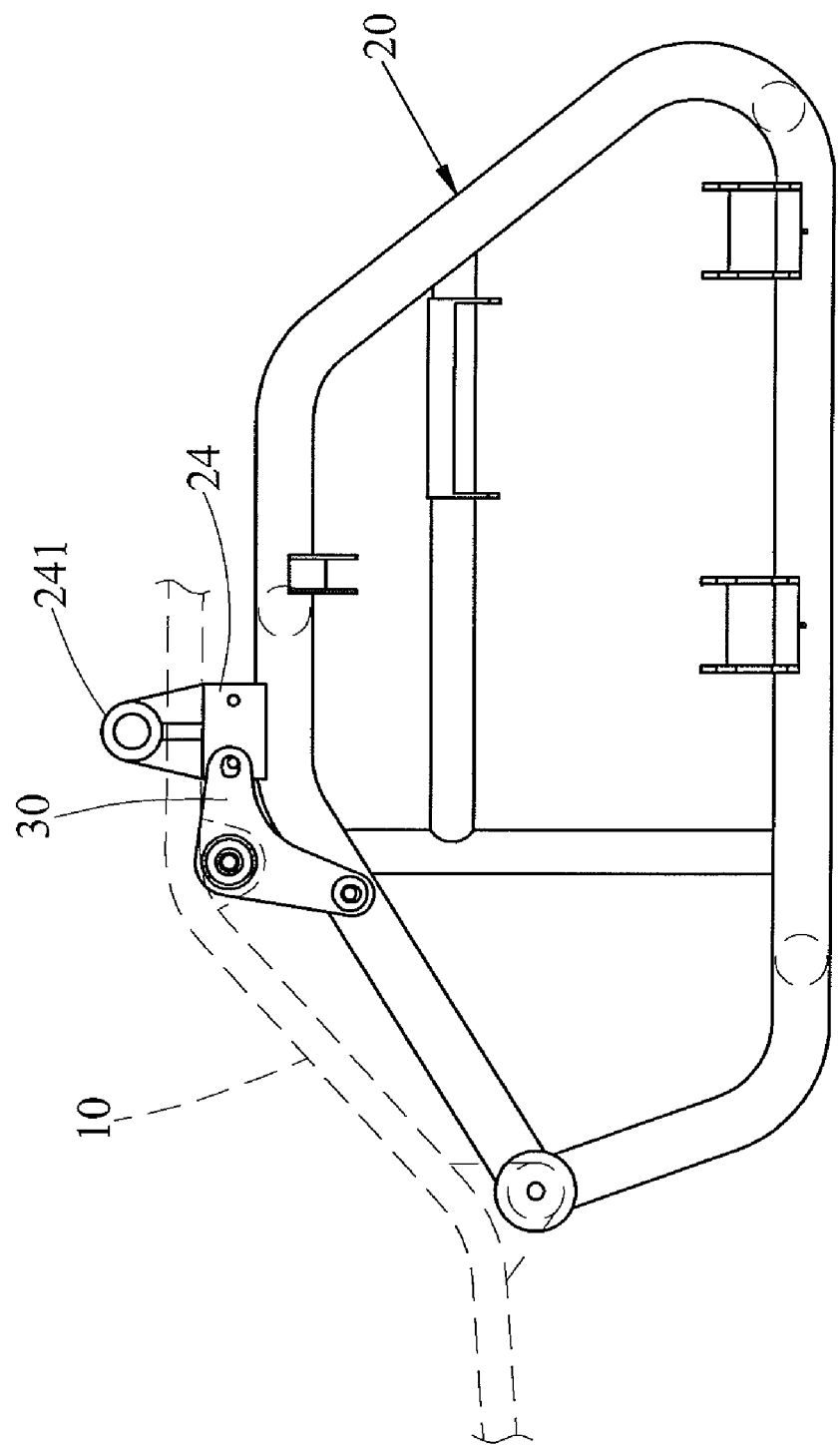
FIG. 4 is a schematic side elevation of FIG. 2.
Figure 5:
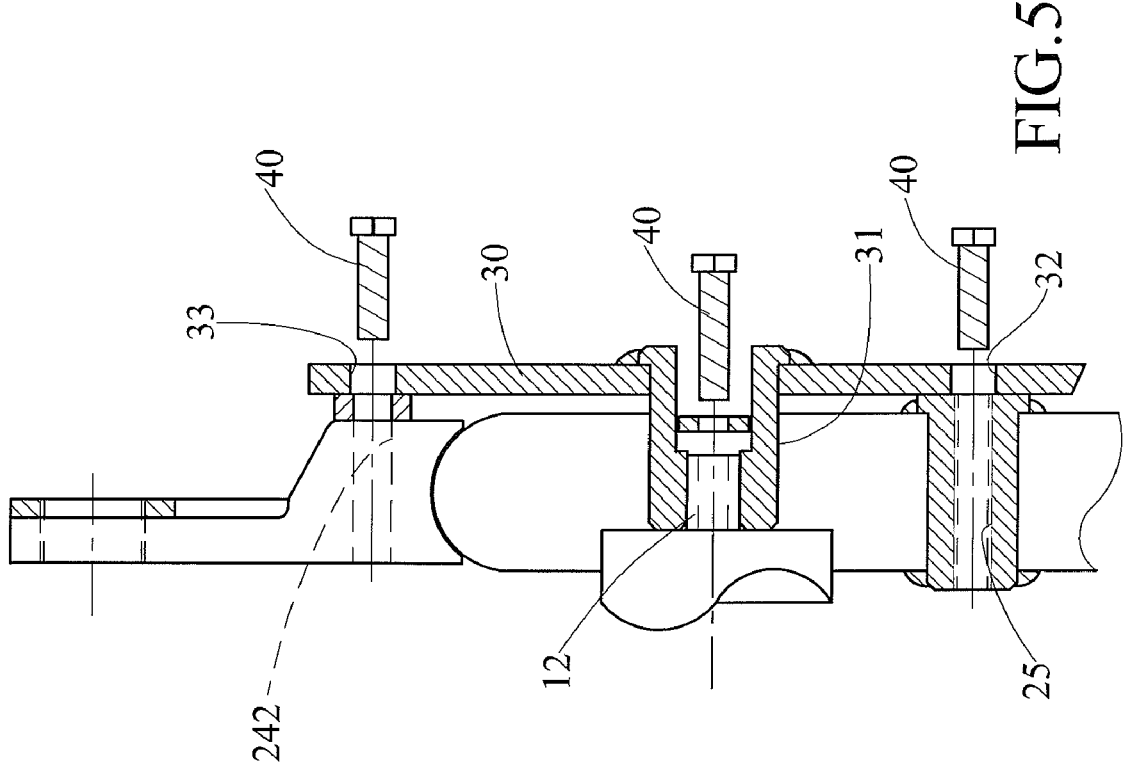
FIG. 5 is a sectional view of the reinforcement plate with the screws to be driven thereinto.

The rear wheels mounting structure 20 further comprises two inverted L-shaped reinforcement plates 30 (see FIG. 4). The reinforcement plate 30 comprises a hollow boss 31 projecting inward from a bending point, a first through hole 32 proximate one end, and a second through hole 33 proximate the other end.

The rear wheels mounting structure 20 further comprises a plurality of screws 40 in which a first screw 40 is driven through the boss 31 into the second cylindrical coupling member 12, a second screw 40 is driven through the first through hole 32 into the second threaded hole 25, a third screw 40 is driven through the second through hole 33 into the first threaded hole 242, a fourth screw 40 is driven through both the cylindrical joint 23 and one of two sleeves 42 into the third cylindrical coupling member 13, and a fifth screw 40 is driven through both one of two cylinders 41 and the top joint 241 into the first cylindrical coupling member 11 to secure the reinforcement plate 30, the rear wheels mounting structure 20, and the motorized tricycle 10 together.

The rear wheels mounting structure 20 further comprises two sets of suspension assembly 50 and shock absorber 60 in which one rear wheel 70 and one side of the rear wheels mounting structure 20 are assembled together by one set of suspension assembly 50 and shock absorber 60 and the other rear wheel 71 and the other side of the rear wheels mounting structure 20 are assembled together by the other set of suspension assembly 50 and shock absorber 60.

In detail, either suspension assembly 50 comprises a lower A-shaped arm 51 interconnecting one rear wheel 71 and the bottommost side piece 21 of the same side, and an upper rod 52 interconnecting one rear wheel 71 and the intermediate side piece 21 of the same side.

The shock absorber 60 comprises a spring-biased rod member 61 interconnecting either rear wheel 70 (or 71) and the topmost side piece 21.

While the invention herein disclosed has been described by means of specific embodiments, numerous modifications and variations could be made thereto by those skilled in the art without departing from the scope and spirit of the invention set forth in the claims.

What is claimed is:

1. A motorized tricycle comprising a frame including first, second, and third cylindrical coupling members having a threaded bore, two rear wheels, and a rear wheels mounting structure comprising:

a plurality of side pieces on either side;

a plurality of cross pieces interconnecting the side pieces;

two spaced cylindrical first joints at two forward ends respectively;

two seats each projecting upward from the topmost side piece and comprising a top second joint and a bottom first threaded hole;

two second threaded holes each disposed on a section between the first joint and the second joint of the same side;

two inverted L-shaped reinforcement plates comprising a hollow boss projecting inward from a bending point, a first through hole proximate one end, and a second through hole proximate the other end;

two sleeves each put on the first joint;

two cylinders each disposed in the second joint; and a plurality of threaded fasteners wherein at either side of the frame a first threaded fastener is driven through the boss into the second cylindrical coupling member, a second threaded fastener is driven through the first through hole into the second threaded hole, a third threaded fastener is driven through the second through hole into the first threaded hole, a fourth threaded fastener is driven through both the cylindrical joint and the sleeve into the third cylindrical coupling member, and a fifth threaded fastener is driven through both the cylinder and the top joint into the first cylindrical coupling member to secure the reinforcement plate, the rear wheels mounting structure, and the frame together.

2. The motorized tricycle of claim 1, further comprising two suspension assemblies each comprising a lower A-shaped arm interconnecting the rear wheel and the bottommost side piece of the same side, and an upper rod interconnecting the rear wheel and the intermediate side piece of the same side.

3. The motorized tricycle of claim 1, further comprising two shock absorbers each comprising a spring-biased rod member interconnecting the rear wheel and the topmost side piece of the same side.

* * * * *